(12) United States Patent
Risen, Jr. et al.

(10) Patent No.: US 6,959,280 B1
(45) Date of Patent: *Oct. 25, 2005

(54) METHOD OF PROTECTING AGAINST A CHANGE IN VALUE OF INTELLECTUAL PROPERTY, AND PRODUCT PROVIDING SUCH PROTECTION

(75) Inventors: William M. Risen, Jr., Rumford, RI (US); Diane F. Covello, W. Hartford, CT (US)

(73) Assignee: IP Value, LLC, W. Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/473,662

(22) Filed: Dec. 29, 1999

Related U.S. Application Data

(63) Continuation of application No. 08/966,062, filed on Nov. 8, 1997, now Pat. No. 6,018,714.

(51) Int. Cl.[7] .............................................. G06F 17/60
(52) U.S. Cl. ....................................................... 705/4
(58) Field of Search ......................... 705/1, 4; 283/54

(56) References Cited

U.S. PATENT DOCUMENTS

| | | | | |
|---|---|---|---|---|
| 4,616,854 A | * | 10/1986 | Landrum et al. ............. | 283/74 |
| 4,642,768 A | * | 2/1987 | Roberts ......................... | 705/4 |
| 4,722,055 A | * | 1/1988 | Roberts ......................... | 705/36 |
| 4,766,539 A | * | 8/1988 | Fox ............................... | 705/4 |
| 4,831,526 A | * | 5/1989 | Luchs et al. .................. | 705/4 |
| 4,839,804 A | * | 6/1989 | Roberts et al. ............... | 705/36 |
| 4,975,840 A | * | 12/1990 | DeTore et al. ................ | 705/4 |
| 5,083,270 A | * | 1/1992 | Gross et al. .................. | 705/35 |
| 5,136,502 A | * | 8/1992 | Van Remortel ............... | 705/2 |
| 5,202,827 A | * | 4/1993 | Sober ............................ | 705/36 |
| 5,446,653 A | * | 8/1995 | Miller et al. .................. | 705/4 |
| 5,523,942 A | * | 6/1996 | Tyler et al. ................... | 705/4 |
| 5,537,315 A | * | 7/1996 | Mitcham ....................... | 705/4 |
| 5,608,620 A | * | 3/1997 | Lundgren ...................... | 705/1 |
| 5,655,085 A | * | 8/1997 | Ryan et al. ................... | 705/4 |
| 5,893,072 A | * | 4/1999 | Zizzamia ...................... | 705/4 |
| 5,956,691 A | * | 9/1999 | Powers ......................... | 705/4 |
| 5,999,907 A | * | 12/1999 | Donner ......................... | 705/1 |

(Continued)

FOREIGN PATENT DOCUMENTS

WO        WO 84/01448 A1 *   4/1984

OTHER PUBLICATIONS

The New Encyclopaedia Britannica, vol. 6, pp. 335-336, 15th Edition, 1994.*

(Continued)

*Primary Examiner*—Nicholas D. Rosen

(57) ABSTRACT

Disclosed herein is a method of providing protection against an unexpected change in value of an intellectual property asset, which includes:
- (a). obtaining a description of at least one intellectual property asset of a first party,
- (b). determining a value of the at least one intellectual property asset,
- (c). determining a cost of providing compensation for an unexpected change in value of the at least one intellectual property asset, and
- (d). offering to provide compensation for at least a portion of any unexpected change in value of the at least one intellectual property asset to a person with an interest in the first party. A corresponding data processing system, insurance proposal form and computer-generated insurance policy form also are disclosed. The method, system and forms of the invention can be used, for example, as part of a "due diligence" analysis in the context of the purchase and/or sale of intellectual property assets.

22 Claims, 2 Drawing Sheets

U.S. PATENT DOCUMENTS

| | | | | |
|---|---|---|---|---|
| 6,009,402 | A * | 12/1999 | Whitworth | 705/4 |
| 6,038,554 | A * | 3/2000 | Vig | 705/400 |
| 6,134,536 | A * | 10/2000 | Shepherd | 705/37 |
| 6,154,725 | A * | 11/2000 | Donner | 705/1 |
| 6,298,327 | B1 * | 10/2001 | Hunter et al. | 705/1 |
| 6,339,767 | B1 * | 1/2002 | Rivette et al. | 707/2 |
| 6,456,982 | B1 * | 9/2002 | Pilipovic | 705/35 |
| 6,470,321 | B1 * | 10/2002 | Cumming et al. | 705/4 |
| 2002/0032586 | A1 * | 3/2002 | Joao | 705/4 |

OTHER PUBLICATIONS

The New Encyclopaedia Britannica, vol. 15, pp. 741-754, 15$^{th}$ Edition, 1994.*

Harbert, T., "Patent Enforcement Policy Aids Technology Transfer," Technology Access Report, published by University R&D Opportunities, Inc., Mar. 15, 1990.*

Cripe, J., "Insurance a Must for Some Lending Programs," San Antonio Business Journal, Oct. 10, 1997.*

Mulcahy, C., "Intellectual Property Ins. [urance] Sales Slow," National Underwriter (Property & Casualty/Risk & Benefits MAnagement), vol. 99, No. 3, pp. 3, 14, Jan. 16, 1995.*

Lane, A.A., "Patent Enforcement Insurance," High Technology Business, vol. 9, No. 1, p. 8, Jan., 1989.*

Robinson, W.J., "Insurance Coverage of Intellectual Property Lawsuits in the Computer Industry," International Computer Law Adviser, Dec. 1991-Jan. 1992, pp. 21-43.*

Higdon, D., "Patent Policy Covers Plaintiffs' Litigation Costs," Journal of Commerce, p. 13A, Oct. 3, 1989.*

Friedman, D.D., Economic analysis of law, Stanford cource outline, 1996, www.best.com/-ddfr.*

Rechtin, M.D., "Intellectual Property Due Diligence for the Buyer of Seller of a Business," The Lawyers and Legal Resource,Fe 1994.*

Anson. W., "Setting Market Values for Trade Secrets," The Law Works, pp. 16,17,20,28, Feb. 1995.*

Anson, W., "Valuing Trademarks, Patents, and Other Intangibles—in a Bankruptcy Environment," The Law Works, pp. 9 an 18, Aug. 1995.*

Fancher, J.D., "How Insurance Can Reduce Intellectual Property Risks," National Underwriter, Feb. 24, 1997.*

Golant, J.H., "A Seventeen Year Monopoly for a Security," The Law Works, pp. 4, 5, 14, 16, Jul. 1994.*

Zotos, F.P., "Unlocking the Potential of Innovation . . . " Intellectual Property Today, pp. 9, 28, 29, Sep. 1997.*

Coffin, "Mind Field," Best's Review, (Property/Casualty), vol. 98, No. 4, pp. 36-40, Aug. 1997.*

Amer. International Specialty Lines Ins. Co., Patent Infringement Indemnity Insurance Form, Feb. 1995.*

AIG Advertisement for Patent Infingement Insurance, date unknown.*

Printout from Docie Marketing Website (4 pages), date unklnown.*

Bennett, P., "Insuring against Patent Infringement," International Corporate Law, Oct. 1994.*

Anon., "A.M.Best: Insuring Intellectual Property Remains a Niche, Despite Rapidly Growing Need," Business Wire, Aug. 4, 1997.*

Anon., "Intellectual Property Products," http://www.aon.com.risk/risk_management/intellectual_property/ip_products.jsp, printed Feb. 4, 2003.*

Anon., "Common Uses for IP Insurance," http://www.hillersandwagner.com/uses.asp, printed Feb. 4, 2003.*

Pratt, S.P., et al., "Valuing a Business: The Analysis and Appraisal of Closely Held Companies," Fourth Edition, 2000, McGraw Hill, pp. xix-xxxii, 305-341, 639-696, 808-814, and 915-924.*

Hayden, V.C., "Fee for Service Idea Revamps Life Insurance Insurance," Fairfield County Business Journal, vol. 22, No. 32, p. 11, Sep. 2, 1991.*

Arkin, J., "An Insurance Consultant May Benefit Your Bottom Line," Air Conditioning, Heating, and Refrigeration News, vol. 193, No. 5, p. 22, Oct. 3, 1994.*

* cited by examiner

METHOD OF PROTECTING AGAINST A CHANGE IN VALUE OF INTELLECTUAL PROPERTY, AND PRODUCT PROVIDING SUCH PROTECTION

This application is a continuation of application Ser. No. 08/966,062 filed on Nov. 8, 1997, Now U.S. Pat. No. 6,018,714.

FIELD OF THE INVENTION

The present invention relates to intellectual property, and more particularly relates to protection against changes in value of intellectual property.

BACKGROUND OF THE INVENTION

Patents, trademarks, service marks, trade secrets, trade dress rights and copyrights, referred to collectively herein as "intellectual property," provide an owner with the right to exclude others from making, using or selling particular product and services. When a business or portion of a business is sold, the seller and purchaser usually conduct a limited "due diligence" analysis to determine a value for the portfolio of intellectual property to be sold and purchased. Because an extensive analysis of the intellectual property involves both legal and business value analysis and, in the end, contains some unknown and unknowable elements, the purchaser of a business often must assume a reasonable degree of risk related to intellectual property. The transaction, whether a sale, refinancing, investment decision or other transaction, also poses risks to the directors of both companies, financiers, lenders, and other parties, both as to their investments and their liabilities.

It would be useful to provide a method of spreading the risk which is associated with the purchase of intellectual property among one or more parties who are neither purchasers or sellers of the business.

SUMMARY OF THE INVENTION

An object of the invention is to provide a method of spreading the financial risks associated with the purchase, ownership and use of intellectual property.

Another object of the invention is to provide an insurance product which protects the value of intellectual property assets.

A further object of the invention is to provide a method of insuring the validity of patents, trademarks, copyrights and other intellectual property.

Yet another object of the invention is to provide insurance for patents and other intellectual property in the context of acquisitions and mergers.

Other objects of the invention will become apparent from the remainder of the specification and the claims.

A preferred form of the invention is a method of providing protection against an unexpected change in value of an intellectual property asset, comprising:

(a). obtaining a description of at least one intellectual property asset of a first party, (b). determining a value of said at least one intellectual property asset, (c). determining a cost of providing compensation for an unexpected change in value of said at least one intellectual property asset, and (d). offering to provide compensation for at least a portion of any unexpected change in value of said at least one intellectual property asset to a person with an interest in the first party.

In a particularly preferred form of the invention, the method further comprises:

(e). obtaining a first fee in exchange for offering to provide compensation. Step (d) preferably includes providing an evaluation of said at least one intellectual property asset.

In another particularly preferred form of the invention, steps (a)–(d) and optionally step (e) are executed by, or on behalf of, an offeror, and the method further comprises:

(f) accepting the offer to provide compensation, step (f) being executed by said person with an interest in the first party. Step (f) preferably includes paying a second fee to the offeror.

In a preferred form of the invention, the "value" of the at least one intellectual property asset in step (b) includes at least one future value, and the unexpected change in value is determined at the time for which said at least one future value was determined. The value in step (b) preferably further includes a current value of said at least one intellectual property asset.

The intellectual property asset preferably includes at least one member selected from the group consisting of patent rights, patent application rights, trademark rights, service mark rights, copyright rights, trade secret rights and trade dress rights, The "person with an interest in the first party" preferably is the first party, an officer of the first party, a director of the first party, a prospective purchaser of the intellectual property asset or assets, or a director or officer of the prospective purchaser. Even more preferably, the "person with an interest in the first party" is a party other than the first party. Most preferably, the "person with an interest in the first party is a prospective purchaser and/or the officers and/or directors of the prospective purchaser.

The "unexpected change in value" referred to above, if such change occurs, preferably is based at least in part upon a legal determination of invalidity and/or unenforceability of the patent, trademark, copyright or other intellectual property right. In a preferred from of the invention, the "value" of the asset includes at least one of a financial value and a monopolistic right.

Step (b) of the method described above preferably includes analyzing the validity of the intellectual property asset or assets. Step (b) alternatively or also preferably includes assigning a monetary value to the intellectual property asset or assets.

In a particularly preferred from of the invention, the intellectual property asset or assets include at least one patent right. The intellectual property assets covered by the method of the invention also can include pending patent applications.

The method of the invention most preferably is directed to a situation in which compensation is offered to the party with an interest in the first party in connection with (e.g. upon, after or subject to) transfer of ownership of the intellectual property asset or assets to a second party.

Another preferred form of the invention is a method of insuring against a risk of an unexpected reduction in the value of a patent right, comprising:

assigning a value to the patent right while the patent right is owned by a first party, estimating the likelihood of an unexpected reduction in value of the patent right, and agreeing to provide compensation to a person with an interest in the first party for at least a portion of any unexpected reduction in value of the patent right during a particular period of time after receipt of an insurance premium, the insurance premium being paid in connection with a transfer of ownership of the patent right.

A further preferred form of the invention is a method of providing protection against an unexpected change in value of at least one intellectual property asset, comprising:

(a). obtaining a description of the at least one intellectual property asset owned by a first party, (b). determining a value of said at least one intellectual property asset, (c). determining a cost of providing compensation for a future unexpected change in value of said intellectual property asset, and (d). agreeing to provide compensation to a person with an interest in the first party for at least a portion of any future unexpected change in value, the agreement being made in connection with a transfer of said at least one intellectual property asset to a second party.

Another preferred form of the invention is a data processing system for use in administering an insurance program to insure the value of an intellectual property asset, comprising:

(a). means for receiving a first numerical input which includes at least one of the following numerical values or sets of values:

(i). a first numerical value or set of values which is representative of the likelihood that the intellectual property asset would be found valid if the validity of the asset was determined by litigation, (ii). a second numerical value or set of values which is representative of a predicted appraised value of the intellectual property asset during a particular period of time, and (iii). a third numerical value or set of values which is representative of the likelihood of a competitive patent causing a significant reduction in the predicted appraised value of the intellectual property asset during a particular period of time, and (b) means for calculating a proposed insurance premium based upon at least the first numerical input.

A further preferred form of the invention is an insurance proposal form, comprising:

a plurality of first pattern areas including alphanumeric characters representing a set of insurable intellectual property assets owned by a first party, a plurality of second pattern areas including alphanumeric characters representing a likelihood that one or more particular intellectual property assets in the set would be found valid and/or enforceable if their validity and/or enforceability was determined by litigation, and a plurality of third pattern areas including alphanumeric characters representing a proposed premium for insuring against an unexpected change in value of at least a portion of the set of insurable intellectual property assets. The form preferably further comprises a plurality of fourth pattern areas including alphanumeric characters representing a person designated to receive the insurance proposal form, said person being a party with an interest in the first party.

Yet another preferred form of the invention is an insurance proposal form, comprising:

a plurality of first pattern areas including alphanumeric characters representing a set of insurable intellectual property assets owned by a first party, a plurality of second pattern areas including alphanumeric characters representing a proposed premium for insuring the proposed set of insurable intellectual property assets, and a plurality of third pattern areas including alphanumeric characters representing a second party designated to receive the insurance proposal form, the second party being a proposed purchaser of the set of insurable intellectual property assets.

In yet another preferred form, the invention is a computer-generated insurance policy form offering to insure at least a portion of the value of at least one intellectual property asset exclusive of legal fees, the insurance policy form being generated in connection with a proposed transfer of ownership of said at least one intellectual property asset. The policy form preferably is directed to patent rights.

Yet another preferred form of the invention is a computer-generated insurance form for protecting a right to practice technology which is described in an agreement to transfer intellectual property assets of a company, the computer-generated insurance form being generated in connection with a proposal to transfer ownership of the intellectual property assets from a first party to a second party.

Another embodiment of the invention is a method of providing protection against a change in value of an intellectual property asset, comprising: (1) obtaining a description of an intellectual property asset owned by a first party, (2) determining a value of said intellectual property asset, (3) determining a cost of providing compensation for a future change in value of said intellectual property asset, (4) agreeing to provide compensation to a second party for at least a portion of any future change in value upon, after, or subject to transfer of said intellectual property asset to the second party, and (5) collecting at least a portion of said cost of providing compensation.

A further embodiment of the invention is an insurance policy for insuring at least a portion of the value of an intellectual property asset, the insurance policy becoming effective at a time of transfer of ownership of said at least one intellectual property asset.

Another embodiment of the invention is a method of insuring intellectual property which includes the above-described method of providing protection against a change in value of intellectual property and also includes other types of insurance protection for the intellectual property, such as, for example, payment of legal fees and other expenses associated with the enforcement of intellectual property rights.

Further forms of the invention are a method and an insurance product for protecting a right to practice technology which is described in an agreement to transfer intellectual property assets of a company, the term of the insurance commencing at the time of transfer of the assets from a first party to a second party.

Yet another form of the invention is a method of providing protection against a risk of reduction in value of at least one patent right, comprising: assigning a value to the patent right while the patent right is owned by a first party, estimating the likelihood of a reduction in value of the patent right, and agreeing to provide compensation for at least a portion of any reduction in value of the patent right during a particular period of time after receipt of an insurance premium, the insurance premium being paid in connection with a transfer of the patent right to a second party.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

Figure 1:
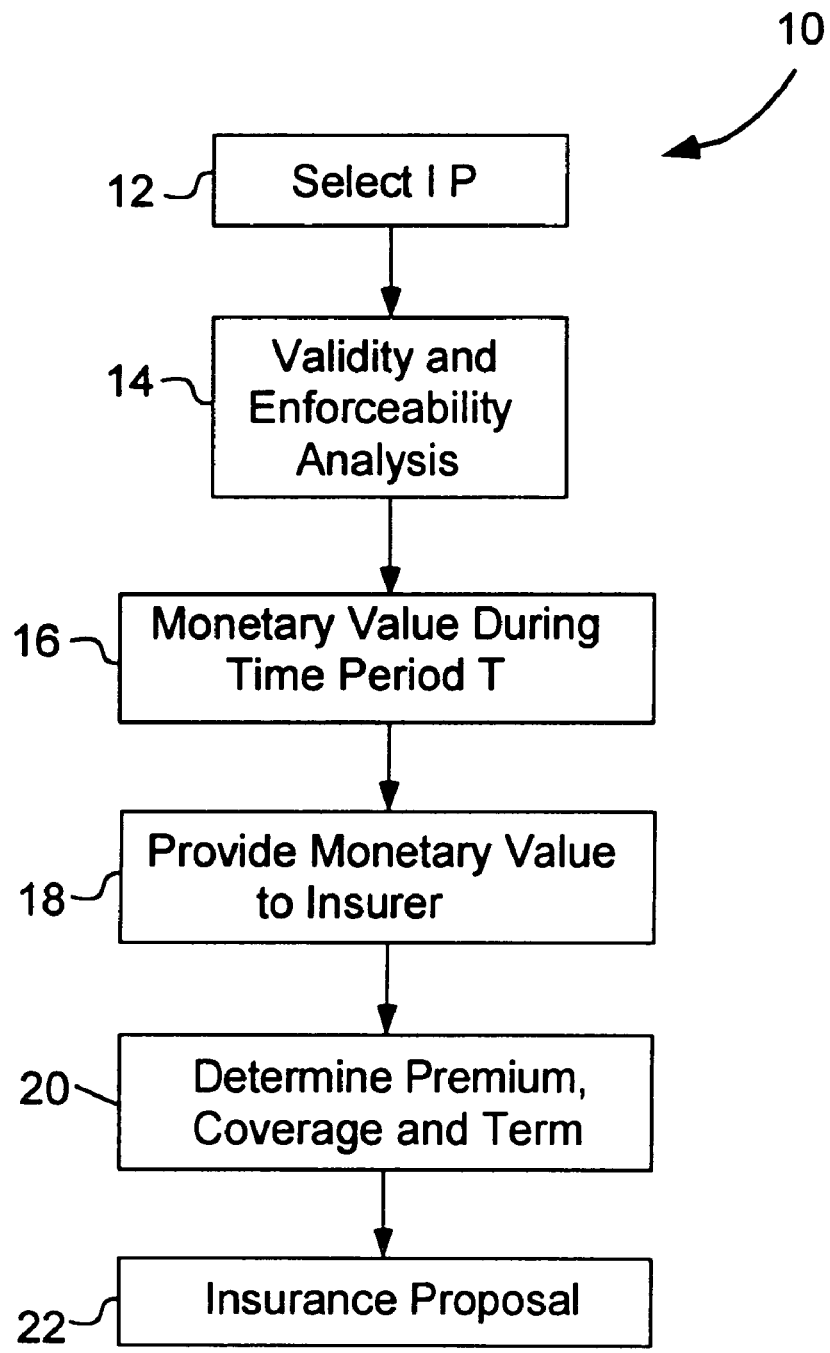
FIG. 1 is a flowchart illustrating a method for issuing an insurance proposal according to a preferred embodiment of the invention.

The present invention provides for a sharing of the risk associated with the purchase, sale and/or ownership of intellectual property assets. Furthermore, the legal, technical and financial analysis which is conducted in connection with underwriting an insurance product to cover an intellectual property asset can also serve as a component in a "due diligence" analysis which is conducted in preparation for the purchase or sale of a business or portion of a business. Thus, the invention can provide the directors of a selling or purchasing company with protection against claims that they had incorrectly assessed the intellectual property of a company involved in an asset transfer. Non-limiting examples of situations in which the method and product of the invention would be useful are described below on Table 1.

TABLE 1

SOME COMMERCIAL RELATIONSHIPS IN WHICH THE USE OF THE METHODS AND PRODUCTS OF THIS PATENT SHOULD BE VALUABLE:

| EVENT THAT IS PLANNED OR POSSIBLE | ENTITY CONTRACTING FOR INSURANCE PROPOSAL | POTENTIAL APPLICATION |
|---|---|---|
| Company A to be sold to Company B | Company B | Company B wants insurance that will compensate them in the event that (1) one of Company A's key patents is subsequently found to be invalid or unenforceable, and/or (2) they are not free to operate under a valid patent and are put out of the business (or have specified diminished business) because of another patent in the area. |
| Company A to be sold to Company B | Directors and/or Officers of Company A | The directors and/or officers want to insure themselves in the event that current shareholders in Company A claim they sold the company for too low a price because they did not realize the value of the intellectual property. They also want insurance to cover any liability in the event that Company B or its owners claim that the Directors of Company A did not satisfy their due diligence requirement with respect to disclosure of information that could materially impact the value of the company. |

TABLE 1-continued

SOME COMMERCIAL RELATIONSHIPS IN WHICH THE USE OF THE METHODS AND PRODUCTS OF THIS PATENT SHOULD BE VALUABLE:

| EVENT THAT IS PLANNED OR POSSIBLE | ENTITY CONTRACTING FOR INSURANCE PROPOSAL | POTENTIAL APPLICATION |
|---|---|---|
| Company A to be sold to Company B | Merger and Acquisition Brokers | The brokers of the deal to purchase and resell Company A, or to merge Company A into another entity, wants to insure that they are assessing the value of the company accurately and to protect their investment. In the resale or merger transaction, they want to insure against losses due to purchaser claims that they misrepresented the value of the intellectual property of Company A. |
| Company A to be sold to Company B | Directors and/or Officers of Company B | They want to insure themselves to cover any potential damages awarded to shareholders in Company B due to the fact that Company B's Directors paid too much for Company A because they did not do a competent job of evaluating the value of Company A's intellectual property. |
| Company A to be sold to Company B | Financiers of Company B, such as bankers, stock issue underwriters | They want insurance to cover their losses in the event that their capital is lost (or their customers' capital is lost) due to a poor assessment of the value of Company A because the intellectual property is valued incompetently. |
| Company A to be sold to Company B | Company B | They want insurance to cover the losses they incur as a result of the fact that knowledge (about facts, events or trends that prove to have a material impact on the profitability of the company) known to Company A was not revealed by Company A or its owners at the time of sale. |
| Company A applies for a license to operate | Company A | Company A needs to be able to demonstrate to a governmental regulatory agency that it is a qualified applicant by demonstrating that it has the right to employ certain intellectual property. |
| Company A makes a contract proposal to Company D | Company A | Company A needs to be able to demonstrate that it has the right to employ certain intellectual property, such as operational patents, trademarks, or copyrights needed to fulfill the contract. |
| Company A has a provisional patent which it wants to be a valid issued patent | Company A | The President of Company A wants insurance to cover the possibility that an investment in using the intellectual property covered by a provisional patent application (e. g. in building a plant to use a technology) will not be wasted or devalued because Company A could not obtain a valid patent with substantially the same claims. |

TABLE 1-continued

SOME COMMERCIAL RELATIONSHIPS IN WHICH
THE USE OF THE METHODS AND PRODUCTS OF
THIS PATENT SHOULD BE VALUABLE:

| EVENT THAT IS PLANNED OR POSSIBLE | ENTITY CONTRACTING FOR INSURANCE PROPOSAL | POTENTIAL APPLICATION |
|---|---|---|
| Company A has a provisional patent which it wants to be a valid issued patent | Financiers of Company A's investment plans | The financiers (bankers, etc.) of Company A wants Company A to have insurance to cover the possibility that an investment in using the intellectual property covered by a provisional patent application (e.g. building a plant to use a technology) will not be wasted or devalued because Company A could not obtain a valid patent with substantially the same claims |
| Company A has a trade secret that could become known to a competitor | Company A | Company A wants insurance (proposal) to cover any losses of profits due to disclosure to a competitor of any legal method or information about competing in the marketplace. This could be a technical or a business method or piece of information, but it must be one that is legal to use and rightfully obtained, not one such as how to evade another entity's patent or how to evade laws. |

In general, intellectual property can be described as the legal grant of a right to exclude others from engaging in certain activities during a certain period of time in a certain region. An agreement to insure intellectual property rights thus can be viewed as an agreement to provide compensation to the insured party if that party's right to exclude is lost or is terminated sooner than expected.

One of the most preferred embodiments of the invention is specifically directed to the context of a purchase and sale of intellectual property assets. While other insurance products may cover, for example, a portion of the litigation costs associated with enforcing or defending a patent, or in defending the sale or use of a product or process which is patented by another, one preferred embodiment of the invention is instead directed to insuring the validity of the intellectual property in a manner analogous to protecting real estate with title insurance.

As used herein, "unexpected change in value" refers to a change in value which results from information which was not known to the insurance company or to the insured party at the time that the insurance policy was issued. Stated another way, this unexpected change is the difference between the actual change in value over time and any expected change in value over time. The value of an intellectual property asset will be expected to decrease as any predetermined expiration date of exclusivity approaches, such as the expiration date of a patent or copyright. Value of an intellectual property asset also may be expected to change as a result, for example, of the likelihood that the technology covered by the intellectual property asset will eventually be rendered obsolete due to new technology which is unknown, or which is known but is not yet commercialized. The amount of an expected change in value can be agreed upon by the parties or can be determined by the insurance company or other party which evaluates the intellectual property. On the other hand, value of an intellectual property asset may change unexpectedly as a result of technology which is unknown at the time the insurance policy is issued. Furthermore, value of an intellectual property asset will change if the asset is found as a result of legal proceedings to be invalid or unenforceable. Depending upon the language of the insurance policy, this type of unexpected change in value of the insured intellectual property may be compensated for under the policy.

An "unexpected change in value" preferably, but not necessarily, is exclusive of the amount of attorneys fees expended or which would need to be expended in order to preserve the exclusive rights and ownership rights of the intellectual property asset. It is contemplated that the method of the invention covers monetary losses, such as reduced profits or lost market share, connected with a loss of exclusivity of the rights which were believed to be protected by (1) an intellectual property asset which subsequently is found to be invalid or unenforceable, and/or (2) an intellectual property asset which is devalued as a result of another patent in the area. In a particularly preferred embodiment of the invention, an "unexpected change in value" does not include (3) the attorney's fees relating to infringement, validity, enforceability and/or ownership disputes for intellectual property. However, the method of the invention can cover (1), (2) and (3) in combination.

With respect to liability of merger and acquisition brokers and the directors and officers of sellers or purchasers, in the preferred embodiment of the invention, an "unexpected change in value" refers to a degree to which an intellectual property portfolio has been undervalued or overvalued. In this context, an insurance policy according to the invention typically would compensate the directors, officers or brokers for damages for which they are liable, and if covered by the policy, their attorneys fees in the lawsuit.

When the intellectual property asset is a patent, the step of obtaining a "description of at least one intellectual property asset" which is recited in the claims generally entails obtaining a copy of the patent, and, in at least some cases, its file history. For other intellectual property assets, a description of the asset may entail a copy, sample, specimen, prototype, and/or written description of the asset.

"A first party" as this language is used in the claims refers to the owner (or in some cases the licensee) of the intellectual property asset or assets at the time that the asset or assets are valued. "A person with an interest in the first party" can be, for example, one or more of the parties listed in column 2 of Table 1 above, including the first party itself. Most frequently, this person will be a corporation which is a potential purchaser or licensee of the intellectual property asset or assets, the directors of the potential purchaser or licensee, or the officers of the potential purchaser or licensee, as these persons likely have a strong interest in obtaining a thorough analysis of the intellectual property asset or assets which they intend to purchase or license.

The step of determining a value of an intellectual property asset generally includes two parts. First, a legal analysis is conducted to confirm the validity and enforceability of the patent or other intellectual property asset. For a patent, this generally will involve a validity search and opinion, confirmation of correct ownership of the patent, correct inventorship of the patent, and an analysis of the enforceability of the patent. This analysis may include, for example, not only a study of prior art patents and literature but also may include interviews, histories, depositions, etc. of inventors or other relevant persons including but not limited to those who might not be available at a later date because they leave the company. The likelihood of the patent or patent application being involved in interference proceedings, and a predicted outcome of the interference, also may be considered. For a copyright, the analysis generally will involve confirmation of originality in the author. For a trade secret, the analysis will involve confirmation that proper steps have been followed to maintain "trade secret status" under the law. For trademarks and service marks, registrations will be confirmed along with correct usage of the marks and, if necessary, a search of confirm that no prior user rights exist which are not known to the prospective purchaser.

The second step of valuation of the intellectual property asset is the assignment of a monetary value to the intellectual property asset. For example, if the asset is a patent and if one or more claims of the patent are found to be valid and enforceable in the legal analysis, a value is then assigned to the patent. This value can be based, for example, upon the income and profits generated by the sale or use of the patented technology, the number of years remaining on the term of the patent, the breadth of the patent claims, the nature of the patented technology, the nature of competitive products or processes, etc. One such method is described below in Prophetic Example 2. Other intellectual property assets can be assigned a monetary value in conventional ways by persons who specialize in, or have the skills needed, to value intellectual property. In another embodiment of the invention, the prospective purchaser of the intellectual property asset assigns their own value to the intellectual property, similar to the manner in which the U.S. Post Office allows a customer who purchases insurance for a parcel to select the desired amount of insurance coverage. While this latter valuation technique is simpler, it is likely to be more difficult to use in statistically determining an appropriate insurance premium.

After the patent or other intellectual property has been valued, an actuarial analysis or other technique can be used to determine a suitable premium for insuring the value of the patent or other intellectual property. In the patent claims which are provided below, this premium is referred to in a general way as "a cost of providing compensation for an unexpected change in value" of the intellectual property asset or assets. In addition to using the value determined for the patent or other intellectual property asset as a basis for setting the premium, many of the same considerations involved in determining that value can be used again to determine a suitable premium for insuring the intellectual property asset or assets.

After a suitable insurance premium has been determined, the insurance company, agent of the insurance company, a person who has a relationship with the insurance company or another entity which functions as an insurance company in the context of the method of the invention prepares a contract proposal. In the proposal, the insurance company or other authorized person offers to provide compensation for at least a portion of any unexpected change in value of the intellectual property asset if the change occurs or is first recognized during a particular period in time. In the context of a transfer of ownership of an intellectual property asset, coverage typically would begin after ownership of the intellectual property asset has been transferred to the purchaser. In some instances, coverage could extend to cases in which a loss in value occurs prior to transfer but the reduction is not known to the purchaser until after the time of purchase.

In exchange for insurance coverage, the insured party or prospective insured party would pay an insurance premium at an appropriate time. In one embodiment of the invention, it is envisioned that the insurer would pay the insured party the value of the intellectual property which is insured minus a deductible if the intellectual property asset or assets were subsequently found to be invalid or unenforceable in a court of law. Other variations of this embodiment could include partial payments by the insurer if, for example, the intellectual property asset were found to have a substantially lower value than originally thought, due, for example, to the development of a noninfringing competitive product by a third party.

Once a premium has been set, it typically is scheduled to be paid within a period of time after execution of the insurance contract. When the policy is to take effect subject to transfer of the intellectual property asset to a second party, it preferably can be paid as part of the transaction costs. The premium typically is paid by the purchaser of the intellectual property, but other payment arrangements also are within the scope of the invention. For example, the seller may have an interest in purchasing insurance to avoid the risk of being sued in the future on an issue relating to warranties made in connection with the sale of intellectual property assets. It is also within the scope of the invention to insure license rights to intellectual property. This type of insurance might be sought by a licensee who plans to invest substantial resources into technology which is licensed from another. In this case, the licensee would collect on the insurance if it was unable to enforce rights under the patent after making substantial investments in order to practice the patented technology or make or sell a patented product.

In a preferred embodiment of the invention, a single premium is paid to provide insurance for a patent for a predetermined period of time, such as the life of the patent or a period of time, such as one, two, three, five or ten years, which may correspond to the time period for which it is believed that the technology claimed in the patent will be important to the purchaser.

In a particularly preferred embodiment of the invention, the insurance contract proposal prepared by the insurance company (or another entity which provides information or services to the insurance company) is presented to the prospective insured entity in exchange for a fee, which compensates the insurance company or other entity for the preparation of the proposal, including the costs of legal and financial advice, which may come from third parties, at a price agreed to by the insurance company. The insurance contract proposal can, but need not necessarily, contain some or all of the information used in formulating the proposal, such as legal opinions, assessments, estimates, evaluations and valuations. The prospective insured can be offered the option of having these informational bases directly submitted to the potential insured by their originators without substantial modification of content. These legal and financial opinions could be used by a prospective seller or purchaser as part of its "due diligence" analysis which is conducted in anticipation of selling or purchasing the intellectual property assets which are the subject of the insurance proposal. As these opinions would have been fully paid for by the proposed insured party, they can be kept by the proposed insured party even if the party decides to decline insurance coverage.

The method of the invention preferably is carried out using one or more computer programs to generate insurance proposal forms. The computer program or programs preferably include a data processing system which receives numerical input and calculates a proposed insurance premium based upon the numerical input.

As indicated above, one aspect of valuing an intellectual property asset is to assign it a monetary or financial value.

Assigning a monetary value to a patent can be difficult. One preferred method of assigning such a value is to retain a firm which specializes in the valuation of intellectual property, such as Trademark and Licensing Associates, Inc. For example, it may be useful to apply the VALMATRIX system of valuation, which was developed by Trademark and Licensing Associates, Inc. This system is proprietary to the owner, and can be used by the owner to provide a party with a valuation of intellectual property upon payment of appropriate compensation. Another method for assigning a value to a patent would be to use the method described in U.S. Pat. No. 5,608,620, assuming that the method described in claim 6 of the '620 patent can be modified for that purpose. Further methods are described below in the Examples. Furthermore, a recognizably arbitrary valuation could be placed on the intellectual property for any expressed business purpose or reason recognized by the insurance company.

From a practical standpoint, the method of the invention can be described by the following three-step process:

Step 1. Ascertaining the facts about the issues, including the pertinent facts for insuring intellectual property according to the method of the invention, including, e.g.,
  a. what business and legal risks are to be addressed by the insurance,
  b. what relevant intellectual property exists, and
  c. what business facts should be considered.

Step 2. Evaluating the intellectual property both legally and financially.

Step 3. Formulating and presenting for sale to the potential insured entity an insurance contract proposal which contains those legal and other opinions, evaluations, and studies about the entities and their intellectual properties that were used to formulate the policy proposal. It also contains the terms and conditions of the policy.

These steps may be understood better by considering them in the following ways.

Step 1, ascertaining the facts about the issues, is an important step that preferably goes well beyond the fact-gathering which typically is involved in exercising diligence in a sale or other business event, because one purpose here is to contribute to assessing a risk that can be covered by the insurance policy. Thus, ascertaining what risks that are to be addressed by insurance is a significant part of the invention, although it usually is not a part of other legal assessments of intellectual property. It is a key part of the formulation of an insurance proposal, and it helps to define and limit what legal and business facts are relevant. Furthermore, ascertaining the relevant business facts, especially financial information, typically is not part of an assessment of a legal position, but it is important to evaluating the intellectual property position of a company and making an insurance proposal. Clearly, it is necessary to ascertain the legal facts and the additional information that is needed to understand them.

In Step 2, the intellectual property is legally evaluated and financially valued. In one approach to financial valuation of the intellectual property, legal evaluations are carried out using the accepted legal practices with additional advice, as needed, from appropriate experts in law and other matters. The financial evaluations can be assigned by agreement or reached through a valuation process. In one method of the invention, a number of parameters describing the intellectual property are defined. Each parameter is then assigned a numerical value. The numerical values are utilized in determining the financial terms of the insurance contract proposal.

Step 3, formulating an insurance contract proposal, involves determining which portions of the legal evaluation and financial valuation are to be provided to the insured party, and defining the scope, duration and cost of proposed insurance coverage. In one preferred form of the invention, the insurance proposal includes the legal and financial opinions which are used as a basis for determining insurance premiums and dollar limits of coverage available for a particular intellectual property portfolio. The legal and financial opinions normally are to be paid for by the party seeking insurance whether or not the party eventually executes an insurance contract.

Figure 2:
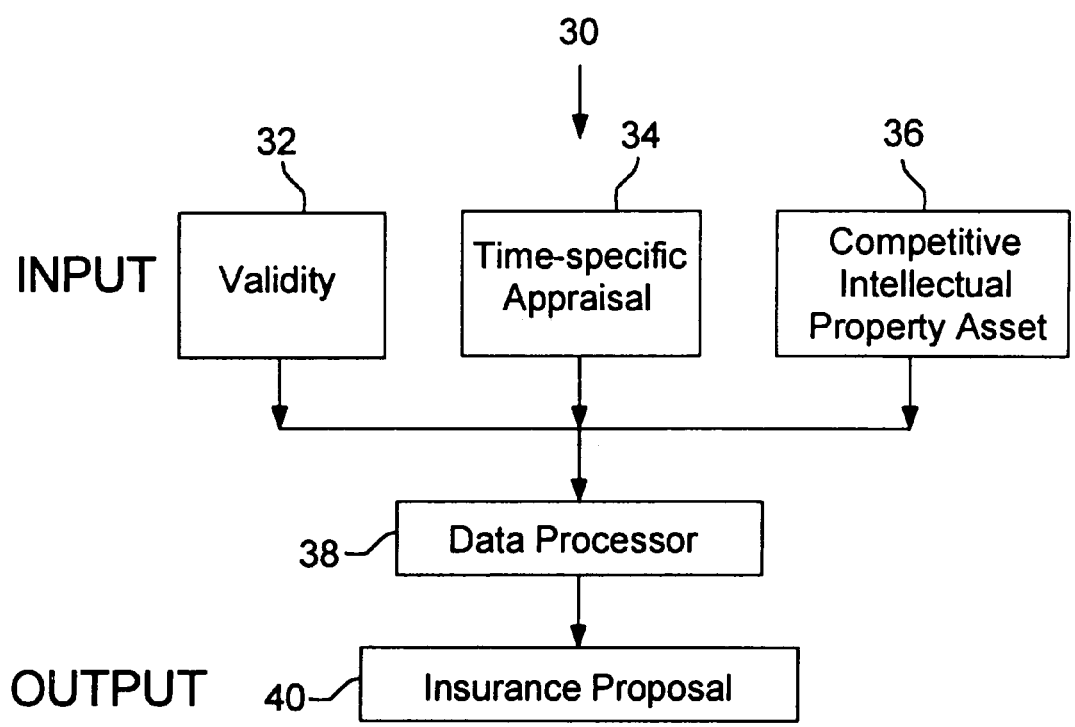
FIG. 2 is a flowchart showing the operation of a data processing system according to a preferred embodiment of the invention.

FIGS. 1 and 2 are included in order to provide an increased understanding of the invention but are not intended to limit the scope of the invention.

Referring to FIG. 1, a flowchart that illustrates a method of preparing and issuing an insurance proposal for intellectual property assets is shown and is designated as 10. The intellectual property that is to be the subject of the proposal is selected in step 12. A validity and enforceability analysis of the intellectual property is conducted in step 14. An expected monetary value or set of values for the intellectual property during period T is determined in step 16. This value or set of values is provided to the proposed insurer in step 18. Suitable values for premium, coverage, and the term of coverage are determined in step 20, and an insurance proposal form is generated in step 22.

Referring to FIG. 2, a flowchart showing the operation of a data processing system according to one preferred form of the invention is shown and is designated as 30. At least one input 32, 34, or 36 is input into the data processing system Input 32 is a first numerical value or set of values which is representative of the likelihood that the intellectual property asset would be found valid if the validity of the asset was determined by litigation. Input 34 is a second numerical value or set of values which is representative of a predicted appraised value of the intellectual property asset during a particular period of time. Input 36 is a third numerical value or set of values which is representative of the likelihood of a competitive intellectual property asset causing a significant reduction in the predicted appraised value of the intellectual property asset during a particular period of time. The data processing system processes the input data in step 38 and delivers an output in the form of an insurance proposal at 40.

The following Examples are included in order to provide a better understanding of the invention but are not intended to limit the scope of the invention in any way.

PROPHETIC EXAMPLE 1

Company A is preparing to purchase Company B. Company A obtains a list of the intellectual property assets owned by Company B. Company A provides the list of intellectual property assets to Valuator, which preferably is an independent firm or a division or subsidiary of Insurance Company D. Valuator works with Company A to determine which intellectual property assets of Company B should be insured. These assets are referred to as IIPA (identified intellectual property assets), and typically include the intellectual property assets of Company B which Company A believes are the most valuable. Valuator then obtains a legal analysis of the validity and enforceability of the IIPA by hiring a competent patent attorney to write a legal opinion of validity and enforceability. Company A pays for the legal analysis and for the services of Valuator in obtaining the legal opinion. If the legal opinion is favorable, Valuator obtains an opinion of the monetary value of the IIPA during a particular period of time in the future by hiring a competent valuator of intellectual property. Company A pays for the financial analysis and pays for the additional services of Valuator. Preferably Company A pays its fees for the legal evaluation and the financial valuation directly to the insurance company, Company D, but in some cases payment may be made directly to Valuator or to persons retained by Valuator to provide services.

Valuator then provides the underwriters at Insurance Company D (or outside underwriters retained by Insurance Company D) with the legal and financial analysis of the IIPA. Insurance Company D provides Company A with a proposal to insure the validity and enforceability of the IIPA for the monetary value determined by Valuator minus a particular deductible. Company A then has the option of accepting the insurance proposal. If Company A accepts the proposal, Company A typically will enter into an agreement with Company D in which Company A will pay the insurance premium to Company D when Company A becomes the owner of the IIPA. Assuming that Company A becomes the owner of the IIPA and pays the insurance premium, Company A will be entitled to collect on the policy if the monetary value of the IIPA subsequently is determined to be incorrect as a result of the IIPA being found invalid or unenforceable.

PROPHETIC EXAMPLE 2

Company A is preparing to purchase Company B. Company A approaches Insurance Company D for insurance to cover the value of six patents covering the best-selling computer system of Company B. Company A is interested in purchasing insurance to compensate them in the event that the technology package covered by the six key patents is rendered obsolete in the next thirty six months as a result of technology which has appeared in two 18-month foreign patent publications owned by a particular competitor but which has not yet been patented in the U.S. by the competitor.

Some of the facts to be ascertained and utilized by Insurance Company D in step 1 include (1) "right to use" insurance related to the technology covered by its six existing patents is sought by Company A for a period of three years, (2) Company B has six relevant patents, (3) there are likely to be pending U.S. patent applications owned by the competitor which correspond to the 18-month foreign patent publications, and (4) the value of the right to use these patents for the succeeding three years may be reduced if U.S. patents issue to the competitor.

In Step 2, a number of parameters describing the intellectual property are defined. Then, the values of these parameters are evaluated. Any suitable method for carrying out this actual evaluation, such as the method described in U.S. Pat. No. 5,608,620, the VALMATRIX method of Trademark and Licensing Associates, Inc., a method consisting only of specified and agreed evaluations, or a method based on the expert opinions can be used to carry out this step. One approach, which is limited in definition and application, is described in the following paragraphs. Other suitable evaluation methods may be used within the spirit of this invention.

Illustrative Method for Step 2

Each piece of intellectual property is specified by a set of parameters of the form $X_{i,j,k}$ where i indexes the type of intellectual property, j indexes the field of application (e.g. a product or process), and k indexes the number of the intellectual property of the type i,j. For example, if i=1 means that the intellectual property is a patent, j=3 indicates that it relates to the third process used by the company, and k=6 indicates that it is the sixth patent that relates to the third process, the parameters relating to this piece of intellectual property would be of the type $X_{1,3,6}$.

These $X_{i,j,k}$ parameters contain information about a particular item of intellectual property. There are as many $X_{i,j,k}$ variables as needed to describe a particular piece of intellectual property. A simple set is defined in Tables 2 and 3. Those in Table 2 describe intellectual property of a subject company, called Co. A. There, parameters A through F are defined for several types of intellectual property of Co. A. Those in Table 3 describe the intellectual property of a competitor, called Co. D. There, parameters K through R are defined for several types of intellectual property. These parameters can be numbers or they can be functions of other variables, such as time.

By way of illustration, $C_{1,3,6}$ is the probability that the sixth patent held by company A and relating to its third product will be found to be valid. The other parameters relate broadly to the existence of a piece of property ($A_{i,j,k}$), to the validity of its ownership ($B_{i,j,k}$), to the probability of its legal validity ($C_{i,j,k}$), to the probability of it being employed for commercial purposes ($D_{i,j,k}$), to the probability that its validity will be tested ($E_{i,j,k}$), and to the contribution it makes to the company financially ($F_{i,j,k}$). While these definitions do not cover all possible variables (e.g., they do not designate country of coverage and other considerations), they help to illustrate the way in which evaluations of these aspects of the intellectual properties could be recorded in the form of the parameters. The parameters in this form could be used to prepare the overall evaluations and the insurance proposal.

The relevant parameters are identified for a particular case. The values of some of the parameters can be determined by agreement between the insurance company and the proposed insured. The values of the others are determined by an appropriate evaluation method. The evaluation method could be, for example, one of the methods referred to above, or a method which involves obtaining the opinion of one or more experts in the field. The preferred method is to obtain the opinions from the most experienced available expert for each issue and to obtain the opinion of two more highly qualified experts for those areas where there is reason to consult further or where there is a large financial risk. Once the values for these parameters have been obtained, they can be used to evaluate the overall terms of the insurance policy.

Using the values assigned by agreement between the insurance company and the proposed insured or obtained by expert evaluation, a number of types of derived values can be obtained. For example, the net asset value of Co. A's position in business area j can be calculated. One way to do that, using the definitions in Tables 2 and 3, is to employ a relationship such as the following: The net intellectual asset value of Co. A's position in business area j can be taken to be $Z_j=V_j-I_j$. Here, $V_j$ is the value of the intellectual property of Co. A in business area j. And, $I_j$ is the impact on Co. A in this business area of the intellectual property of the other entities in the world, which are represented in this case by Co. D.

Since $$V_j = \sum_i \sum_k V_{ijk},$$

where $V_{ijk}=A_{ijk}B_{ijk}C_{ijk}D_{ijk}E_{ijk}F_{ijk}$, and $$I_j = \sum_i \sum_k I_{ijk},$$

where $I_{ijk}=K_{ijk}L_{ijk}M_{ijk}N_{ijk}Q_{ijk}R_{ijk}$, the expression $Z_j=V_j-I_j$ can be obtained. The change in value could be expressed in the form $$Y_j = I_j + \sum_i \sum_k A_{ijk}[(1-B_{ijk}) + (1-C_{ijk})]D_{ijk}(1-E_{ijk})F_{ijk},$$

where account is taken of the way probabilities of various combinations of events occurring can be combined. With such evaluations of value and probable change in value of the intellectual property position, the insurance policy can be addressed.

Step 3. The insurance policy generally contains the following elements. It contains the legal and financial analyses and other information about the company, Co. A, on which the insurance proposal is based. These may merely contain conclusions, such as numerical values assigned to particular intellectual property assets or sets of intellectual property assets or may include a comprehensive legal and financial analysis of one or more pieces of intellectual property. Furthermore, it contains insurance policy proposals to provide coverage whose extent is agreed between the insurer and the insured. These policy provisions are binding on the insurance company. The insurance policy proposal and the supporting work is purchased by the potential insured. Typically, the purchase is made pursuant to an initial contract to prepare this proposal.

On the basis of the facts and evaluations, the insurance company presents, in exchange for a fee, an insurance contract proposal to compensate Company A in an amount equal to the value of using the patents if they are prevented from doing so in the subsequent two years for legal reasons in exchange for a premium of one-tenth of that value per three month period.

TABLE 2

Definitions of Parameters Employed in
Exemplary Applications of the Invention:
Parameters Concerning Company A ( see Note 1)

| A | i | j | k | obtained by | meaning of parameter |
|---|---|---|---|---|---|
| $A_{1jk}$ | 1 | | | definition and search | A patent exists in business area j. It is the $k^{th}$ patent in this area. The value of this parameter can be 0 or 1 in any given period, or it can be any value between 0 and 1 for a projected average value at a given time or over a given period. For example, it may be 0.5 for a calculation that employs the evaluated probability of a pending patent being in force at a given time being 0.5. Clearly, $A_{ijk}$ is generally a function of time, at least, and can be specified functionally in terms of the relevant parameters, such as time, investment required to prosecute, legal entity where valid, etc. |
| $A_{2jk}$ | 2 | | | same | A patent application has been filed with specified anticipated claims relative to area j. It is the $k^{th}$ such item. |
| $A_{3jk}$ | 3 | | | same | A trademark exists in area j. It is the $k^{th}$ trademark in this area. |
| $A_{4jk}$ | 4 | | | same | A copyright exists in area j. It is the $k^{th}$ copyright in this area. |
| $A_{5jk}$ | 5 | | | same | A trade secret exists and is specified and documented in area j. It is the $k^{th}$ trade secret in this area. |
| $A_{6jk}$ | 6 | | | same | A specific key person in the company has abilities to provide specific utility in area j. This is the $k^{th}$ key person in this area. |

| B | i | j | k | obtained by | meaning of parameter |
|---|---|---|---|---|---|
| $B_{1jk}$ | 1 | | | evaluation | probability that the ownership, title, current effectiveness (paid up fees, etc.), lack of fraud result in a validly owned patent |
| $B_{2jk}$ | 2 | | | evaluation | same as above, but for the patent application. This includes the information required to prosecute the patent application to issuance |
| $B_{3jk}$ | 3 | | | evaluation | same as above, but applied to trademark |
| $B_{4jk}$ | 4 | | | evaluation | same as above, but applied to copyright |
| $B_{5jk}$ | 5 | | | evaluation | same as above, but applied to legitimacy of a trade secret, proprietary information, etc. |
| $B_{6jk}$ | 6 | | | evaluation | probability of continuing a productive employment relationship with a person who is key to business success in area j in the face of a challenge to that continuance. |

| C | i | j | k | obtained by | meaning of parameter |
|---|---|---|---|---|---|
| $C_{1jk}$ | 1 | | | evaluation | probability that the patent will be found valid (note that this applies to the claims that are relevant to the company's business in area j) |
| $C_{2jk}$ | 2 | | | evaluation | probability that a valid patent containing substantially the same claims as are contemplated in the patent application will issue to the company in a timely way. |
| $C_{3jk}$ | 3 | | | evaluation | probability that the trademark will be found to be valid |
| $C_{4jk}$ | 4 | | | evaluation | probability that the copyright will be found to be valid |
| $C_{5jk}$ | 5 | | | evaluation | probability that a purported trade secret has value beyond what could be done by a person normally skilled in the art that is applicable to area j. |
| $C_{6jk}$ | 6 | | | evaluation | probability that the key person has effectively useful knowledge that is irreplaceable in a practical way in terms of the business purpose associated with area j. |

| D | i | j | k | obtained by | meaning of parameter |
|---|---|---|---|---|---|
| $D_{1jk}$ | 1 | | | evaluation or agreement | probability of use for a commercial purpose, including sale or licensing, in area j. (Note that it could become useful in another, not currently commercial, manner in the instant company, or it could be sold for other applications. In those cases, the value of j is different.) |
| $D_{2jk}$ | 2 | | | same | same as above, but for the intellectual property in the patent application, whether granted as a patent or withdrawn and used as a trade secret. |
| $D_{3jk}$ | 3 | | | same | same as above, but for the trademark |
| $D_{4jk}$ | 4 | | | same | same as above, but for the copyright |

TABLE 2-continued

Definitions of Parameters Employed in
Exemplary Applications of the Invention:
Parameters Concerning Company A ( see Note 1)

| | i | j | k | obtained by | meaning of parameter |
|---|---|---|---|---|---|
| $D_{5jk}$ | 5 | | | same | same as above, but for the trade secret |
| $D_{6jk}$ | 6 | | | same | same as above, but for the contribution of the key person |
| E | i | j | k | obtained by | meaning of parameter |
| $E_{1jk}$ | 1 | | | evaluation or agreement | The probability that the validity of the $k^{th}$ patent in area j will not be tested legally. |
| $E_{2jk}$ | 2 | | | evaluation or agreement | same as above, but applied to issued patent based on the patent application |
| $E_{3jk}$ | 3 | | | evaluation or agreement | same as above, but applied to the $k^{th}$ trademark in area j. |
| $E_{4jk}$ | 4 | | | evaluation or agreement | same as above, but applied to the $k^{th}$ copyright in area j. |
| $E_{5jk}$ | 5 | | | evaluation or agreement | probability that the trade secret will not be learned by a competitor |
| $E_{6jk}$ | 6 | | | evaluation or agreement | probability that the key person will not be presented with a commercial opportunity to leave the employ of the company. |
| F | i | j | k | obtained by | meaning of parameter |
| $F_{1jk}$ | 1 | | | evaluation or agreement | Contribution to the company financially. This could be agreed between the parties, this and could be the gross profits from products sold monopolistically, license fees, perceived value from advertising the existence of the patent, the cost avoidance enabled by practicing the invention, the profits generated in a business due to the freedom to operate provided by the patent, the future market development, or any other financially defined contribution attributed in area j to the $k^{th}$ patent. |
| $F_{2jk}$ | 2 | | | evaluation or agreement | same as above, but asssociated with the intellectual property contained in the patent application. |
| $F_{3jk}$ | 3 | | | evaluation or agreement | Contribution to the company financially associated with the use of the $k^{th}$ trademark in area j. This could be agreed between the parties; it also is inclusive of various types of financial contributions. |
| $F_{4jk}$ | 4 | | | evaluation or agreement | Contribution to the company financially associated with the $k^{th}$ copyright in area j. This could be agreed between the parties; it also is inclusive of various types of financial contributions. |
| $F_{5jk}$ | 5 | | | evaluation or agreement | Contribution to the company financially of the $k^{th}$ trade secret in area j. This could be agreed by the parties. |
| $F_{6jk}$ | 6 | | | evaluation or agreement | Contribution to the company financially made by the presence of the key person. This could be agreed by the parties, and often is determined by the potential future cost avoidance due to the presence and utility of the key person. |

Note 1: Additional parameters and all functional dependences are defined as needed for the situation.

TABLE 3

Definitions of Parameters Employed in
Exemplary Applications of the Invention:
Parameters Concerning a Company, Company D,
Which Competes with Company A (see Note 1)

| K | i | j | k | obtained by | meaning of parameter |
|---|---|---|---|---|---|
| $K_{1jk}$ | 1 | | | definition and search | A patent owned by Co. D exists in area j. It is the $k^{th}$ patent in this area. The value of this parameter can be 0 or 1 in any given period, or it can be any value between 0 and 1 for a projected average value at a given time or over a given period. Clearly, $K_{1jk}$ is generally a function of time, at least, and can be specified functionally in terms of the relevant parameters, such as time, legal entity where valid, etc. |
| $K_{2jk}$ | 2 | | | same | A new patent is likely to be issued to Co. D with specified anticipated claims in area j. It is the $k^{th}$ such item. A prediction, $0 \leq K_{2jk} \leq 1$. |
| $K_{3jk}$ | 3 | | | same | A competing trademark of Co. D exists in area j. It is the $k^{th}$ trademark in this area. |
| $K_{4jk}$ | 4 | | | same | A competing copyright of Co. D exists in area j. It is the $k^{th}$ copyright in this area. |
| $K_{5jk}$ | 5 | | | same | A trade secret exists and can have a material effect on Co. A in area j. It is the $k^{th}$ trade secret in area j. |
| $K_{6jk}$ | 6 | | | same | A specific key person is needed by Co. D for the person's expertise and abilities, to provide specific utility in area j, but not for illegal purposes. This is the $k^{th}$ key person in this area. |
| L | i | j | k | obtained by | meaning of parameter |
| $L_{1jk}$ | 1 | | | evaluation | probability that the ownership, title, current effectiveness (paid up fees, etc.), lack of fraud have resulted in a validly owned current patent |
| $L_{2jk}$ | 2 | | | evaluation | same as above, but for new patent, which is new in the sense that it is issued during the period covered by the proposed insurance. |
| $L_{3jk}$ | 3 | | | evaluation | same as above, but applied to trademark |
| $L_{4jk}$ | 4 | | | evaluation | same as above, but applied to copyright |
| $L_{5jk}$ | 5 | | | evaluation | same as above, but applied to legitimacy of a trade secret, proprietary information, etc. |
| $L_{6jk}$ | 6 | | | evaluation | probability of having a productive employment relationship with a person who is key to business success in area j in the face of a challenge to that continuance. |
| M | i | j | k | obtained by | meaning of parameter |
| $M_{1jk}$ | 1 | | | evaluation | probability that the patent will be found valid (note that this applies to the claims that are relevant to Co. A's business in area j) |
| $M_{2jk}$ | 2 | | | evaluation | same as above |
| $M_{3jk}$ | 3 | | | evaluation | probability that the trademark will be found to be valid |
| $M_{4jk}$ | 4 | | | evaluation | probability that the copyright will be found to be valid |
| $M_{5jk}$ | 5 | | | evaluation | probability that a purported trade secret has value beyond what could be done by a person normally skilled in the art in area j. |

TABLE 3-continued

Definitions of Parameters Employed in
Exemplary Applications of the Invention:
Parameters Concerning a Company, Company D,
Which Competes with Company A (see Note 1)

| | | | | |
|---|---|---|---|---|
| $M_{6jk}$ | 6 | | evaluation | probability that the key person has effectively useful knowledge that is irreplaceable in a practical way in terms of the business purpose associated with area j. |

| N | i | j | k | obtained by | meaning of parameter |
|---|---|---|---|---|---|
| $N_{1jk}$ | 1 | | | evaluation or agreement | probability of need for its use for a commercial purpose by Co. A in area j. |
| $N_{2jk}$ | 2 | | | same | same as above, but for the new patent |
| $N_{3jk}$ | 3 | | | same | same as above, but for the trademark |
| $N_{4jk}$ | 4 | | | same | same as above, but for the copyright |
| $N_{5jk}$ | 5 | | | same | same as above, but for the trade secret |
| $N_{6jk}$ | 6 | | | same | same as above, but for the contribution of the key person |

| Q | i | j | k | obtained by | meaning of parameter |
|---|---|---|---|---|---|
| $Q_{1jk}$ | 1 | | | evaluation or agreement | The probability that the validity of the $k^{th}$ patent in area j will be asserted effectively against Co. A.. |
| $Q_{2jk}$ | 2 | | | evaluation or agreement | same as above, but applied to the new patent issued during the period of the insurance |
| $Q_{3jk}$ | 3 | | | evaluation or agreement | same as above, but applied to the $k^{th}$ trademark in area j. |
| $Q_{4jk}$ | 4 | | | evaluation or agreement | same as above, but applied to the $k^{th}$ copyright in area j. |
| $Q_{5jk}$ | 5 | | | evaluation or agreement | probability that the trade secret will be learned by competitor, Co. D. |
| $Q_{6jk}$ | 6 | | | evaluation or agreement | probability that the key person will be presented with a commercial opportunity to leave the employ of the company. |

| R | i | j | k | obtained by | meaning of parameter |
|---|---|---|---|---|---|
| $R_{1jk}$ | 1 | | | evaluation or agreement | Detriment to the financial position of Co. A. Typically this could be agreed between the parties, and, for example, could be the decrease in gross profits from products theretofore sold monopolistically, license fees, perceived market loss from advertisments about the existence of the patent, the cost of developing and using methods to avoid the invention, the loss of profits due to the loss of freedom to operate caused by the patent, or any other financially defined detriment attributed in area j to the $k^{th}$ patent. |
| $R_{2jk}$ | 2 | | | evaluation or agreement | same as above, but asssociated with the intellectual property contained in the new patent. |
| $R_{3jk}$ | 3 | | | evaluation or agreement | Detriment to Co. A financially associated with the use by Co. D or the discontinuance of use by Co. A of the $k^{th}$ trademark in area j. This could be agreed between the parties; it also is inclusive of various types of financial contributions. |
| $R_{4jk}$ | 4 | | | evaluation or agreement | Detriment to Co. A financially associated with the use by Co. D or the discontinuance of use by Co. A of the $k^{th}$ copyright in area j. This could be agreed between the parties; it also is inclusive of various types of financial contributions. |
| $R_{5jk}$ | 5 | | | evaluation or agreement | Detriment to Co. A financially of the $k^{th}$ trade secret in area j being known by Co. D. This could be agreed by the parties. |
| $R_{6jk}$ | 6 | | | evaluation or agreement | Detriment to Co. A financially made by the presence of the key person form Co. A in Co. D. This could be agreed by the parties. It often is determined by the potential future cost avoidance due to the presence and utility of the key person. |

Note 1: Additional parameters and all functional dependences are defined as needed for the situation.

PROPHETIC EXAMPLE 3

This example concerns the case in which Company A, (Co. A), has a patent with an expiration date eight years from the starting date of the proposed insurance policy. The insurance policy would cover only that eight year period. The insurance company, Co. C, and Co. A agree that the annual value of operating with the patent is $1.0 \times 10^7$ per year.

When Co. A plans to invest in additional manufacturing capacity in the field in which this patent is believed to give it a monopoly, it approaches a bank for funds. The bank requires that an independent assessment of the value of this patent be obtained in financial terms relative to the agreed value of operating monopolistically within the patent. The insurance company then formulates this in the form of an insurance proposal for Co. A.

The first step is to ascertain the facts, which include the proposed insurance objective. It is to be a policy that will pay Co. A $1.0 \times 10^7$ $ per year during the insured period and subsequent to demonstration that its intellectual property-determined ability to practice the invention has been lost because (1) it has been forced to confront issues of validity, enforceability and/or ownership in a legal contest and (2) has been unsuccessful in maintaining rights under the patent even though it has defended its legal position vigorously.

The second step is to evaluate the probability that the patent can be practiced as intended during this period. The third step is to formulate an insurance policy proposal to cover the potential loss.

When the evaluations are done, it is found that the net intellectual asset value of this patent is $7.6 \times 10^6$ $ per year. The probable loss to be assumed by Co. C is computed by Co. C to be $2.5 \times 10^6$ $/year on average over that period. Co. C offers to provide the coverage for the entire period in exchange for a premium payment of $4 \times 10^7$.

The bank pays for the proposal and the evaluation and analyses on which it is based. It then can use this information in assessing the loan value, take out the insurance, require that Co. A take out the insurance in order to qualify for the loan, take other financial actions amounting to self-insurance based on the evaluation, or take no further action.

PROPHETIC EXAMPLE 4

This example considers a case in which the issues are related to the intellectual property-determined ability of a company, Co. A, to do business in an area, j, in which it has an enabling patent (patent 1), trade secret knowledge, and a pending patent application.

Patent 1 is agreed to be worth $7 \times 10^6$ per year to Co. A in competitive advantage in the general business field. The exclusive use of the trade secret is agreed to be worth $1 \times 10^6$ per year.

If the pending patent application were to result in the patent (patent 2) contemplated therein, it would be for an improvement that, it is agreed, would allow Co. A to reduce its cost of doing business in the field monopolistically by $2 \times 10^6$ per year, and, through a greater market share generated by consequently lower prices, increase its gross profit by $4 \times 10^6$ per year during the five year period covered by the proposed insurance coverage.

It also is this case that there are competitors whose intellectual property positions can impact the valuations of the intellectual property of Co. A. Specifically, Co. D, a competitor, will receive a patent (patent 3) sometime in this period, although that is not known outside of Co. D. If valid and enforceable, patent 3 could be enforced against Co. A, requiring Co. A to pay royalties that add a total of $3 \times 10^6$ per year to its cost of continuing in this business.

The insurance policy being considered is to reimburse Co. B, a prospective purchaser of Co. A, for the losses it would incur during a five year period due to the change in value of the intellectual property position of Co. A. The insurer, Co. C, and the insured, Co. B, agree separately on the method to be used for handling any and all costs and decisions related to any and all legal work related to these and other matters associated with the insurance policy. It further is the case that Co. B will purchase Co. A at the exact time the proposed insurance policy goes into effect for a five year period.

All of the financial values stated and calculated for the purpose of the example are taken to be in real (constant dollar) terms and annualized, so there are no effects of the cost of money or its changes in value to be taken into account. All of the agreements on facts or evaluations are made between the insured (Co. B) and the insurer (Co. C).

The methods of this patent can be applied to this case in the following exemplary fashion, which is outlined first and then detailed.

Step 1: The facts about the issues are ascertained. The intellectual property and business facts so ascertained for this example are stated below in the calculation given in steps 2 and 3. The nature of the risks to be addressed by the insurance policy are defined by the goal of the policy, as stated above. Specifically, it is a policy to reimburse Co. B, the purchaser of Co. A, for the loss it incurs during a five year period due to the change in value of the intellectual property of Co. A in business area j.

Step 2: The valuation of the intellectual property position of Co. A is made and it is related to the risks to be addressed by the insurance policy. The legal, financial, and other analyses used to reach each valuation are documented. One method for reaching a valuation is detailed below as an example of a method that falls within the general invention.

Step 3: An insurance policy proposal is made by Co. C to Co. B in exchange for a fee. The proposal contains all of the legal and related analysis done to reach the valuations, described in Step (2) above, and it contains insurance policy coverage and premium proposals that are binding on Co. C. The pricing of the insurance proposal is generally intended to recover the costs of formulating it, but the price is set by Co. C at its discretion or by negotiated contract with Co. B. Clearly, Co. B then can purchase the coverage at the proposed premium prices, which are set to cover risk, costs and profits, or decline to do so after receiving and paying for the proposal.

Step 2 Details

The net intellectual asset value of Co. A's position in business area j can be calculated by application of the exemplary method described above in Prophetic Example 2. While this is only an example of a method, it uses parameters defined in Tables 2 and 3 to show which are ascertained as facts and which ones are obtained by evaluation. The values assigned to these parameters are combined to show one way to make the invention specific.

Thus, the net intellectual asset value of Co. A's position in business area j can be taken to be $Z_j = V_j - I_j$. Recall that $V_j$ is the value of the intellectual property of Co. A in business area j. $I_j$ is the impact on Co. A in this business area of the intellectual property of the other entities in the world, which are represented in this case by Co. D.

Since $$V_j = \sum_i \sum_k V_{ijk},$$

where $V_{ijk} = A_{ijk} B_{ijk} C_{ijk} D_{ijk} E_{ijk} F_{ijk}$, in this case $V_j = A_{1j1} B_{1j1} C_{1j1} D_{1j1} E_{1j1} F_{1j1} + A_{2j1} B_{2j1} C_{2j1} D_{2j1} E_{2j1} F_{2j1} + A_{5j1} B_{5j1} C_{5j1} D_{5j1} E_{5j1} F_{5j1}$. The first term on the right concerns the existing patent (so, i=1), the second concerns the currently provisional patent application (so, i=2), and the third term concerns the trade secret knowledge (so, i=5).

Since $$I_j = \sum_i \sum_k I_{ijk},$$

where $I_{ijk} = K_{ijk} L_{ijk} M_{ijk} N_{ijk} Q_{ijk} R_{ijk}$, in this case $I_j = K_{2j1} L_{2j1} M_{2j1} N_{2j1} Q_{2j1} R_{2j1}$. Note that there is no term of the type $K_{5j1} L_{5j1} M_{5j1} N_{5j1} Q_{5j1} R_{5j1}$ in order to avoid double counting. If it were included, $K_{5j1} = 0$. The term on the right concerns the new patent (so, i=2).

An estimate of the loss due to a change in value of the intellectual property of Co. A in the business area j can be made from $Y_j$. As a change in value used in an equation, $Y_j$ would be negative. In the current example, the magnitude of $Y_j$ is:

$$Y_j = I_j + A_{1j1}[(1-B_{1j1})+(1-C_{1j1})]D_{1j1}(1-E_{1j1})F_{1j1} + A_{2j1}[(1-B_{1j1})+(1-C_{2j1})]D_{2j1}(1-E_{2j1})F_{2j1} + A_{5j1}[(1-B_{5j1})+(1-C_{5j1})]D_{5j1}(1-E_{5j1})F_{5j1}.$$

The evaluation of the parameters is carried out either by definition and agreement, where possible, or by evaluation by a method consistent with this invention. For the purpose of reducing this example to sample values, the following parameter values are used. Those assumed to have been determined by agreement or as a matter of defined facts are followed by (f), and those obtained by evaluation are followed by an (e).

$A_{1j1}=1(f)$; $B_{1j1}=1(e)$; $C_{1j1}=0.95(f)$; $D_{1j1}=1(f)$; $E_{1j1}=0.95(e)$; $F_{1j1}=7\times10^6(f)$; $A_{2j1}=1(e)$; $B_{2j1}=1(e)$; $C_{2j1}=0.8\ (e)$; $D_{2j1}=1(f)$; $E_{2j1}=0.9\ (e)$; $F_{2j1}=4\times10^6(f)$; $A_{5j1}=1(f)$; $B_{5j1}=0.8\ (e)$; $C_{5j1}=1(e)$; $D_{5j1}=1(f)$; $E_{5j1}=0.6\ (e)$; $F_{5j1}=1\times10^6(f)$; $K_{2j1}=0.5\ (e)$; $L_{2j1}=1(f)$; $M_{2j1}=0.8(e)$; $N_{2j1}=1(f)$; $Q_{2j1}=0.7\ (e)$; $R_{2j1}=3\times10^6(f)$, where F and R are in the units of \$/year.

Based on them:

(1) The net intellectual asset value of Co. A's position in business area j on an average annual basis during the five year period is $Z_j=8.8375\times10^6$ \$/year.

(2) The probable loss due to a change in the value of the intellectual property of Co. A in business area j on an average annual basis during the five year period is $Y^j=0.335\times10^6$ \$/year.

Step 3 Details

The insurance company, Co. C, prepares an insurance proposal for Co. B. It contains all of the foregoing analysis and all of the legal and other opinions and other bases for the evaluations and definitions. It also contains specific promises to provide insurance coverage in exchange for specific premium charges. This proposal is sold to Co. B. In this example, it is assumed that the purchase of the proposal is made pursuant to a contract, which not only specifies the work product expected in the proposal and the price to be paid for it, but that it also establishes confidentiality, grants access to data and personnel, and establishes a method whereby agreement could be reached between the parties on the values of certain parameters and the assumptions about future litigation.

The specific insurance proposal in this example would be as follows. The insurance company offers to insure Co. B for any losses of the types mentioned during one year in the period for $1.56\times0.335\times10^6\ \$=\$0.5226\times10^6$. The factor 1.56 is selected arbitrarily for this example to incorporate the costs and the profits to Co. C in the price. This premium of $0.5226\times10^6$ \$/year would cover Co. B's intellectual property controlled ability to practice patents agreed to be worth $11\times10^6$ \$/year, their retention of exclusive use of the trade secret agreed to be worth $1\times10^6$ \$/year, and their avoidance of royalty payments to Co. D. of $3\times10^6$ \$/year for specified intellectual property predicted to be in patent 3. Thus, the potential protection is for $15\times10^6$ \$/year at a premium of $0.5226\times10^6$ \$/year. This is a simple example and uses annual averages. Naturally, some of the parameters are functions of time, and so would be the terms of an actual policy proposal.

PROPHETIC EXAMPLE 5

This example considers the case in which the issues are related to the intellectual property-determined ability of a company, Co. A, to do business in an area, j, in which it has an enabling patent (patent 1), trade secret knowledge, and a pending patent application. The information given in this case is the same as that of Prophetic Example 4, except that the Directors of Co. A do not necessarily agree that the probability of patent 1 being found to be valid is 0.95, as agreed by Co. B and Co. C for the purpose of preparing the insurance policy proposal to cover the risks as desired by Co. B.

The Directors of Co. A are worried that that might result in too low a sales price for Co. A and that there might be a successful suit by a stockholder against them to recover lost value in the sale of Co. A. Furthermore, they want the value of patent 1 to be evaluated over the remainder of its lifetime, which extends to seven years beyond the date of the proposed sale. So, for this policy, the Directors of Co. A ask that the probability of patent 1 being found to be valid, if tested in a trial to judgment, be evaluated as part of the preparation of the insurance policy.

Application of the methods of this patent, employing one acceptable calculation based on evaluations, produces the following result.

The value of patent 1 over its remaining seven years, with the evaluated probability of validity being found to be 0.99, is $\$1.862\times10^6$ greater than it would be worth if that probability were agreed to be equal to 0.95. This leads to an insurance proposal to the Directors of Co. A. The proposal is for coverage in the amount of $\$1.862\times10^6$ in the event of a successful suit by the stockholders of Co. A. The premium proposed is set by Co. C at $\$1\times10^6$ with the condition that the Directors of Co. A make a recorded and good faith effort to negotiate a higher sales price on the grounds the fair value of patent 1 is $\$1.862\times10^6$ higher than asserted by Co. B. The Directors of Co. A pay for and receive the proposal and supporting information. Other terms of the insurance proposal include a time limit of two years and an agreement on the manner of conducting legal efforts and decisions.

The Directors of Co. A can take the coverage or decline it in favor only of using it in negotiations to raise the selling price of Co. A.

PROPHETIC EXAMPLE 6

This example considers the case in which the issues are related to the intellectual property-determined ability of a company, Co. A, to do business in an area, j, in which it has an enabling patent (patent 1), trade secret knowledge, and a filed provisional patent application. The information given in this case is the same as that of Prophetic Example 4, except that the bankers for Co. B seek an independent evaluation of the trade secret position of Co. A. They ask for an insurance proposal that would cover the loss to the operations being purchased when Co. B purchases Co. A that are associated with the loss of exclusive use of the trade secret.

The insurance company agrees to prepare a proposal for insurance that would cover the portion of the $1\times10^6$ \$/year value of the exclusive use of the trade secret that is lost due to its discovery and successful use by competitors during a period of five years.

In the application of the methods of this patent, the facts are ascertained first. Then a valuation is placed on the trade secret, the probability that it exists, is rightfully owned, will stay secret, and has a value beyond what is widely known to people in the field during the proposed insurance period. For the sake of the example, the net intellectual asset value in the first year is evaluated to be $\$0.8\times10^6$, using a method under this patent. For the second year, it is evaluated to be $\$0.64\times10^6$, because the evaluators' opinion is that the intellectual developments in the field will have a chance of making this trade secret become part of the ordinary knowledge in the field and because there is a greater chance for there to be a market impact on Co. A by the second year.

When the insurance policy is presented to the bank, it is for a policy to cover market losses up to $\$1\times10^6$ for the first year in return for a premium of $\$0.2\times10^6$. For the second year, the premium would be $\$0.4\times10^6$. For the third year, the premium would be $\$0.9\times10^6$, and there would be no coverage offered at less than the possible losses for the fourth and fifth years.

The bank requesting the insurance proposal would pay for and receive the proposal, which would contain the analyses and evaluations that went into its formulation. Then, they can purchase the insurance or not. Whether or not they purchase it, they have received an evaluation of the intellectual property in a form that can be used with great assurance because it comprises not only the careful legal work and experience of experts, it also has a binding proposal from the evaluators to share the risk.

PROPHETIC EXAMPLE 7

Company A is a technology-based company with a portfolio of 10 patents, which it claims provides it with the potential to establish a strong market position in the treatment of radioactive medical and other commercial waste products. It approaches a venture capital firm, Co. B, with the need for $20,000,000 in additional capital. Co. A needs some of the money to develop the inventions up to the stage of marketing, and some of it to continue operations until customers have paid for their products and services.

The venture capital firm begins to put together a fund for this purpose. It needs to know the value of the patent position of Co. A. It particularly needs to know if Co. A can control the use of key aspects of the intellectual properties, because some of them were developed under U.S. Government research contracts, and some were codeveloped with another company, Co. D. It also is concerned about the impact of governmental regulations on Co. A's ability to do business in a timely manner before the proposed funds are used up. These concerns include questions related to interstate transportation of the waste products, export laws related to the first foreign installation in Japan, and local ordinances at the proposed plant sites in the United States.

The venture capital firm, Co. B, contracts with the insurance company, Co. C, for a proposal for insurance that would cover losses due to future changes in value of the intellectual properties of Co. A.

The insurance company ascertains the facts, including identifying the pieces of intellectual property, the nature of the insurance policy requested, and relevant business facts. Then, it carries out the evaluation process. In this case special attention is paid to making certain that the current evaluation reflects fully the current expectations about the future values of the properties. This is done because the "change in value" on which the insurance will be based is the difference between the actual values the properties have in the future and the future value they are assigned in the current evaluation, i.e. their "expected" future value.

Insurance Company C prepares an insurance proposal to cover the losses due to any change in value of the intellectual property of Company A associated with the intellectual property-determined ability to do business during the insured period. This would cover losses if the government or the codeveloping company asserted intellectual property rights, for example, but it would not cover losses due to bans on interstate transportation of radioactive waste. Similarly, it could cover losses due to its inability to use its patent rights in Japan, but it would not include its losses due to newly imposed export or import restrictions.

The insurance proposal includes all of the legal work and analyses of Co. A used in preparing the proposal. Co. C delivers the insurance proposal to Co. B in exchange for a fee. Co. B then can purchase the insurance or use the information and analyses for its own purposes.

PROPHETIC EXAMPLE 8

Company A is a technology-based company with a portfolio of patents and trade secrets. Its product line has grown rapidly in a very competitive environment. The owners of Co. A, who are its technological originators and business principals, decide to put the company up for sale. Through a mergers and acquisitions firm, they offer to sell it to the owners of Co. B, which is a larger firm that might benefit from incorporating Co. A's products into their product line.

The owners of Co. A say that their reasons for selling Co. A have to do with their desire to go their separate ways, return to laboratory research, recover their initial investment, and attend to their families' needs. The owners of Co. B wonder whether there are any other reasons for the sale. In particular, they wonder whether the owners of Co. A have "reason to believe" that the future value of Co. A will be less than projected, because of a change in the value of its intellectual property.

This "reasons to believe" could be based on company-sponsored studies or on the knowledge obtained by the owners during the course of their business. In either event, it could constitute a trade secret. Knowing the information could influence business decisions in important ways. Not knowing the information could cause Co. B to pay too high a price for Co. A.

In order to deal with this issue and the risk it entails, Co. B contracts with Co. C, the insurance company, to provide an insurance proposal. It would protect Co. B against losses due to changes in value of the currently identified intellectual property that were predictable if the trade secret information had been revealed to Co. B before the purchase.

The insurance company first ascertains all of the facts, including the identifiable intellectual property of Co. A, the type of insurance policy to be proposed, the relevant business facts, and the relevant publicly known intellectual property of the identified competitor. Then the insurance company carries out the evaluation steps of the method. It orders a complete legal and related analysis of the intellectual property. In this case, special attention is paid to asking questions about trade secrets, including market projections, knowledge about competitors' research and development, and competitors' knowledge of Co. A's intellectual property, for example. The answers to these questions are put on the legal record.

One use of this information is in evaluating the likelihood that the intellectual property would be employed by Co. A during the insurance period. If the trade secret were that a new competitive product was going to make Co. A's product obsolete and that Co. A could not develop another product quickly enough to stay competitive, the future change in the value of the intellectual property would appear in the evaluation at this point. It also could appear in the evaluation of the intellectual property of competitors if there were a way for the competitor's intellectual property to be evaluated by the insurance company.

Then, the insurance company prepares an insurance policy for Co. B. For this example it will be assumed that the result of the evaluation process is that the value of the intellectual property will not change in the first year but that it has an actuarially assessed probability of declining in value over the last two years of the proposed insurance period. The insurance company prepares an insurance proposal containing these intellectual property evaluations and binding insurance proposals. It delivers the proposal in exchange for a fee for the work. Co. B decides whether to purchase the insurance or use the information otherwise.

It is to be understood that other embodiments of the invention which are covered by the language of the claims also constitute part of this invention. For example, the invention may be directed to technology covered by U.S. and/or foreign patents and patent applications, provisional patent applications, trade secrets, trade dress rights, trademarks, service marks, and copyrights. Furthermore, a party may wish to obtain insurance coverage for the investment which is undertaken to obtain a commercial product after an invention is first conceived. Additionally, the insurance coverage may extend to cover cases in which an employee leaves a company, stealing valuable trade secrets and taking them to another company. In these scenarios, an insurance policy could be issued which could be renewed on an annual basis.

What is claimed is:

1. A computer-implemented method of providing protection against an unexpected change in value of an intellectual property asset, comprising:
   (a). obtaining a description of at least one intellectual property asset of a first party,
   (b). determining a value of said at least one intellectual property asset,
   (c). determining a cost of providing compensation for an unexpected change in value of said at least one intellectual property asset,
   (d). computer-generating an offer to provide compensation for at least a portion of any unexpected change in value of said at least one intellectual property asset to a person with an interest in the first party,
   (e). obtaining a first fee in exchange for said offer to provide compensation, and
   (f) accepting the offer to provide compensation;
   wherein step (f) is executed by said person with an interest in the first party, and
   wherein step (f) includes paying a second fee to the offeror as an insurance premium.

2. A method according to claim 1, wherein step (d) includes providing an evaluation of said at least one intellectual property asset.

3. A method according to claim 1, wherein said value includes at least one future value of said at least one intellectual property asset, and said unexpected change in value is determined at the time for which said at least one future value was determined.

4. A method according to claim 3, wherein said value further includes a current value of said at least one intellectual property asset.

5. A method according to claim 1, wherein said intellectual property asset includes at least one member selected from the group consisting of patent rights, patent application rights, trademark rights, service mark rights, copyright rights, trade secret rights and trade dress rights.

6. A method according to claim 1, wherein said person with an interest in the first party includes at least one member selected from the group consisting of an officer of the first party, a director of the first party, a prospective purchaser of said at least one intellectual property asset, an officer of the prospective purchaser, and a director of the prospective purchaser.

7. A method according to claim 1, wherein said person with an interest in the first party includes at least one member selected from the group consisting of a prospective purchaser of said at least one intellectual property asset, an officer of the prospective purchaser, and a director of the prospective purchaser.

8. A method according to claim 1, wherein said unexpected change in value is based upon a legal determination of at least one of invalidity and unenforceability of said at least one intellectual property asset.

9. A method according to claim 1, wherein step (b) includes analyzing the validity of said at least one intellectual property asset.

10. A method according to claim 1, wherein said at least one intellectual property asset includes at least one patent right.

11. A method according to claim 1, wherein the offer to provide compensation is made to said party with an interest in the first party in connection with transfer of ownership of said at least one intellectual property asset to a second party.

12. A computer-implemented method of providing evidence regarding risk to a value of an intellectual property asset, the method comprising:
   (a). obtaining a description of at least one intellectual property asset of a first party,
   (b). determining a value of said at least one intellectual property asset,
   (c). determining a cost of providing compensation for an unexpected change in value of said at least one intellectual property asset,
   (d). computer-generating an offer to provide compensation for at least a portion of any unexpected change in value of said at least one intellectual property asset to a person with an interest in the first party,
   (e) obtaining a first fee in exchange for the offer to provide compensation, and
   (f) declining the offer to provide compensation, wherein step (f) is executed by said person with an interest in the first party, and wherein said person with an interest in the first party in consequence does not pay a second fee as an insurance premium.

13. A method according to claim 12, wherein step (d) includes providing an evaluation of said at least one intellectual property asset.

14. A method according to claim 12, wherein said value includes at least one future value of said at least one intellectual property asset, and said unexpected change in value is determined at the time for which said at least one future value was determined.

15. A method according to claim 14, wherein said value further includes a current value of said at least one intellectual property asset.

16. A method according to claim 12, wherein said intellectual property asset includes at least one member selected from the group consisting of patent rights, patent application rights, trademark rights, service mark rights, copyright rights, trade secret rights and trade dress rights.

17. A method according to claim 12, wherein said person with an interest in the first party includes at least one member selected from the group consisting of an officer of the first party, a director of the first party, a prospective purchaser of said at least one intellectual property asset, an officer of the prospective purchaser, and a director of the prospective purchaser.

18. A method according to claim 12, wherein said person with an interest in the first party includes at least one member selected from the group consisting of a prospective purchaser of said at least one intellectual property asset, an officer of the prospective purchaser, and a director of the prospective purchaser.

19. A method according to claim 12, wherein said unexpected change in value is based upon a legal determination of at least one of invalidity and unenforceability of said at least one intellectual property asset.

20. A method according to claim 12, wherein step (b) includes analyzing the validity of said at least one intellectual property asset.

21. A method according to claim 12, wherein said at least one intellectual property asset includes at least one patent right.

22. A method according to claim 12, wherein the offer to provide compensation is made to said party with an interest in the first party in connection with transfer of ownership of said at least one intellectual property asset to a second party.

* * * * *